United States Patent

Kubo et al.

[11] Patent Number: 5,931,885
[45] Date of Patent: Aug. 3, 1999

[54] HYDRAULIC CONTROL SYSTEM FOR AN AUTOMATIC TRANSMISSION

[75] Inventors: Takayuki Kubo; Masaaki Nishida; Yoshihisa Yamamoto; Akitomo Suzuki; Hiroshi Tsutsui; Kazumasa Tsukamoto, all of Anjo, Japan

[73] Assignee: Aisin AW Co., Ltd., Japan

[21] Appl. No.: 08/841,716

[22] Filed: Apr. 30, 1997

[30] Foreign Application Priority Data

Apr. 30, 1996 [JP] Japan .................................. 8-109787

[51] Int. Cl.⁶ ........................................................ G06G 7/70
[52] U.S. Cl. ............................ 701/51; 701/68; 477/156; 477/143; 475/123; 475/125
[58] Field of Search ................................. 701/51, 52, 53, 701/67, 68, 58; 477/143, 156, 159, 154, 109, 127, 110, 120; 475/127, 120, 129, 123, 125

[56] References Cited

U.S. PATENT DOCUMENTS

| | | | |
|---|---|---|---|
| 4,565,106 | 1/1986 | Sumiyoshi | 74/359 |
| 4,779,492 | 10/1988 | Yasue et al. | 477/161 |
| 5,020,391 | 6/1991 | Aoki et al. | 477/143 |
| 5,361,651 | 11/1994 | Wakahara | 477/130 |
| 5,441,459 | 8/1995 | Inukai et al. | 475/127 |
| 5,492,508 | 2/1996 | Tsukamoto et al. | 475/125 |
| 5,527,233 | 6/1996 | Tabata et al. | 477/62 |
| 5,697,864 | 12/1997 | Watanabe | 477/98 |
| 5,781,711 | 7/1998 | Tsutsui et al. | 477/156 |

FOREIGN PATENT DOCUMENTS

| | | |
|---|---|---|
| 0317936 | 5/1989 | Australia . |
| 0327004 | 8/1989 | European Pat. Off. . |
| 0354493 | 2/1990 | European Pat. Off. . |
| 0644361 | 3/1995 | European Pat. Off. . |
| 0707164 | 4/1996 | European Pat. Off. . |

*Primary Examiner*—Jacques H. Louis-Jacques
*Attorney, Agent, or Firm*—Lorusso & Loud

[57] ABSTRACT

A control apparatus executes appropriate speed change control under any operating conditions encountered during an up-shift by change-over, without requiring an increase in control logic. Engagement side hydraulic pressure is swept up as a result of an arithmetic operation in torque phase speed change control. Disengagement side hydraulic pressure is calculated by initial speed change control, dependent on the engagement side hydraulic pressure. The engagement side hydraulic pressure is directly controlled and the disengagement side hydraulic pressure is indirectly controlled, i.e. responsive to the engagement side control. Consequently, the same control scheme can be executed regardless of power-on state or power-off state and regardless of vehicle operating conditions.

8 Claims, 10 Drawing Sheets

......... S1 : More than 1
———— S1 : 1
— — — S1 : Less than 1

HYDRAULIC CONTROL SYSTEM FOR AN AUTOMATIC TRANSMISSION

BACKGROUND OF THE INVENTION

1. Field of the Invention

The present invention relates to a hydraulic control system for an automatic transmission mounted on a vehicle, more specifically, to a system providing hydraulic control of a so-called clutch-to-clutch (change-over) speed change operation wherein a predetermined speed stage is obtained by engaging some frictional engagement elements while disengaging other frictional engagement elements, and particularly to a system providing hydraulic control of a clutch-to-clutch speed change operation at the time of an up-shift.

2. Description of the Related Art

In general, vehicle operating (running) conditions, include a power-on state in which an accelerator pedal is depressed during travel so that driving power is transmitted from an engine to wheels, a power-off state in which the accelerator pedal is released during travel so that driving power is not transmitted from the engine to wheels, high-speed driving, high-torque driving, low-torque driving, low-speed driving and the like. Speed change of the automatic transmission is controlled in accordance with the operating conditions experienced during travel.

One approach to hydraulic control of the above-mentioned clutch-to-clutch (change-over) speed change is disclosed in Japanese Patent Application Laid-Open No. 307524/1994. In the disclosed conventional apparatus, disengagement of pre-shift frictional engagement elements is by reduction of engagement force in accordance with a plurality of preset, pre-shift control stages arranged in a continuous series. Likewise, engagement of post-shift frictional engagement elements is set to a plurality of post-shift control stages arranged in a continuous series. Depending on change in rotational speed of the input shaft, the pre-shift control stages and the post-shift control stages are executed in parallel such that a speed change from the pre-shift to the post-shift is executed. Upon execution of the pre-and post-shift control stages, all the stages or some selected stages are executed continuously in the corresponding order to achieve a shift-up speed change in the power-off state or in the power-on state, smoothly and without delay.

As described above, the hydraulic control of the related art detects the operating condition of the vehicle, e.g. power-on or power-off, and selects an appropriate control stage based on the result of that detection. Thus, a control logic for selecting the above-mentioned appropriate control stage is necessary, which requires a corresponding memory capacity.

SUMMARY OF THE INVENTION

Accordingly, an object of the present invention is to provide a hydraulic control system for an automatic transmission capable of providing an appropriate speed change control under any operating condition, without increasing the control logic for control of an up-shift by the clutch-to-clutch (change-over) speed change.

Accordingly, the present invention provides a hydraulic control system for an automatic transmission including: an input shaft for receiving power from an engine output shaft; an output shaft connected to drive wheels of the vehicle; a plurality of frictional engagement elements for changing the torque transfer path between the input shaft and the output shaft; and hydraulic servos for engaging and disengaging the plurality of the frictional engagement elements. A first frictional engagement element of the plurality of the frictional engagement elements is engaged while a second frictional engagement element is disengaged to achieve an up-shift to a predetermined speed stage under control hydraulic operating means for controlling the hydraulic pressures of at least the hydraulic servos for the first and second frictional engagement elements. A control unit receives signals from various sensors which detect vehicle operating conditions and, responsive to those sensor signals, outputs hydraulic control signals to the hydraulic operating means. The control unit includes engagement side hydraulic control means for calculating a change in hydraulic pressure to be applied to the hydraulic servo for the first engagement element and for outputting the calculated result to the hydraulic operating means; and disengagement side hydraulic control means for calculating a disengagement hydraulic pressure for the hydraulic servo which operates the second frictional engagement element, based on the hydraulic pressure applied to the hydraulic servo for the first frictional engagement element, and for also outputting this second calculated result as a signal to the hydraulic operating means.

Since the engagement side hydraulic pressure is directly controlled (primary control) while the disengagement side hydraulic pressure is controlled in dependence thereon (secondary control), even in the power-off state, the disengagement side hydraulic pressure is prevented from releasing too quickly due to a relatively small input torque, as in the case where the disengagement side hydraulic pressure is primarily controlled. Therefore, it is possible to prevent the engagement side hydraulic pressure from going out of control. Regardless of the power-on or power-off state, speed control can be conducted for any given control stage by primary control of the engagement side. Accordingly, there is no need to select an appropriate control stage by detecting an operating condition of the vehicle, which allows the overall memory capacity of the system to be reduced.

In a preferred embodiment of the present invention, the hydraulic control apparatus for an automatic transmission wherein the change in hydraulic pressure applied to the hydraulic servo for the first frictional engagement element with a predetermined pressure gradient calculated based on the holding pressure immediately before the start of the inertia phase which is obtained as a measure of input torque, and on a predetermined period of time which takes into account the response delay in the hydraulic pressure change. Since the predetermined gradient for the engagement side hydraulic pressure is set in accordance with the predetermined period of time which takes into account the response delay in the engagement side hydraulic pressure, it is possible to prevent overall response delay in hydraulic pressure changes.

The disengaging hydraulic pressure of the hydraulic servo for the second frictional engagement element is preferably reduced according to a gradient corrected by first tie-up correcting means which is set so as to ensure a predetermined amount of engine blow (racing). Since the disengagement side hydraulic pressure is corrected by the first tie-up correcting means so as to ensure the predetermined amount of engine blow, a predetermined overlap by the frictional engagement elements on the engagement and disengagement sides is properly maintained, which prevents both unnecessary engine racing and excessive tie-up. Thus, appropriate speed change control is ensured without any feeling of driving discomfort by the driver. The disengaging hydraulic pressure of the hydraulic servo for the second frictional engagement element may be further corrected by second tie-up correcting means for setting an offset value for the gradient of the disengaging hydraulic pressure. Since the gradient of the disengagement side hydraulic pressure is offset by the second tie-up correcting means, taking into account response delay in the hydraulic pressure of the servo for the engagement side frictional engagement element, it is possible to prevent unnecessary engine racing which might otherwise be caused by a deviation in the change-over timing resulting from such a response delay in the hydraulic pressure of the engagement side. Thus, driving discomfort to the driver is avoided. The first and second tie-up correcting means change their respective corrections in accordance with the temperature of oil. In other words, change in hydraulic pressure response time, based on change in viscosity with temperature, is corrected by the first and second tie-up correcting means. Accordingly, unnecessary engine racing and excessive tie-up are prevented, and a feeling of stability is always ensured during a speed change operation. Further, the correcting values generated by the first and second tie-up correcting means may be modified by learning based on the amount of engine blow (racing). Since increased engine racing due to the aging of the frictional engagement elements can be prevented by providing the first and second tie-up correcting means with learning function, driving discomfort is avoided and an appropriate feeling of speed change is always provided.

In another preferred embodiment the disengaging hydraulic pressure of the hydraulic servo for the second frictional engagement element is feedback controlled, based on detection of the amount of engine racing at the time of a speed change, and the disengaging hydraulic pressure is thereby prevented from dropping until the amount of engine racing reaches a second predetermined value if the amount of engine racing exceeds a first predetermined value. Even if the engine races to an extent exceeding a predetermined value during a speed change operation, because of erroneous detection of the engine rotary speed, throttle opening degree or the like, the racing of the engine can be immediately suppressed by feedback control, thus avoiding driving discomfort.

The hydraulic pressure in the hydraulic servo for the second frictional engagement element ("second hydraulic servo"), until the second frictional engagement element is completely drained, may be changed responsive to a monitored vehicle operating condition (e.g., power-on or power-off), which change may be set to a value which is larger at the time of power-on than at the time of power-off. Particularly in power-off where the input torque is small, dragging torque is generated by a predetermined disengaging hydraulic pressure for disengaging the second frictional engagement element (e.g. piston stroke pressure). If the disengaging hydraulic pressure is completely released quickly, the output torque fluctuates, which may cause a shock in the speed change. Furthermore, if release of the predetermined disengaging hydraulic pressure is delayed in power-on, a tie-up may occur and the torque from the output shaft may drop sharply. However, if the amount of change in hydraulic pressure (that is, the gradient thereof) is changed according to the operating condition of the vehicle, appropriate speed change control can always be executed. In power-on, the amount of change in the disengaging hydraulic pressure is set to a relatively large value and its release is implemented relatively early. Thus, excessive tie-up can be avoided. On the other hand, in power-off, the amount of change in the disengaging hydraulic pressure is set to a relatively small value and the release thereof is implemented gradually. Thus, any shock in speed change resulting from torque fluctuation can be avoided.

Thus, in the present invention, when an up-shift is executed by engaging the first frictional engagement element and disengaging the second frictional engagement element, the engagement side hydraulic pressure for the first frictional engagement element sweeps up with a gradient calculated from the holding pressure obtained from, for example, the input torque and a predetermined interval of time. The disengaging hydraulic pressure for the second frictional engagement element is calculated in dependence on the aforementioned engagement side hydraulic pressure.

DESCRIPTION OF THE PREFERRED EMBODIMENTS

The automatic transmission controlled according to the present invention has a plurality of frictional engagement elements such as clutches, brakes and the like, and a speed changing mechanism (not shown) in which a torque transfer path through planetary gearing is established and changed by selectively disengaging/engaging the frictional engagement elements. The input shaft of the automatic speed changing mechanism is coupled to the output shaft of an engine through a torque converter and the output shaft is coupled to the vehicle drive wheels.

Figure 1:
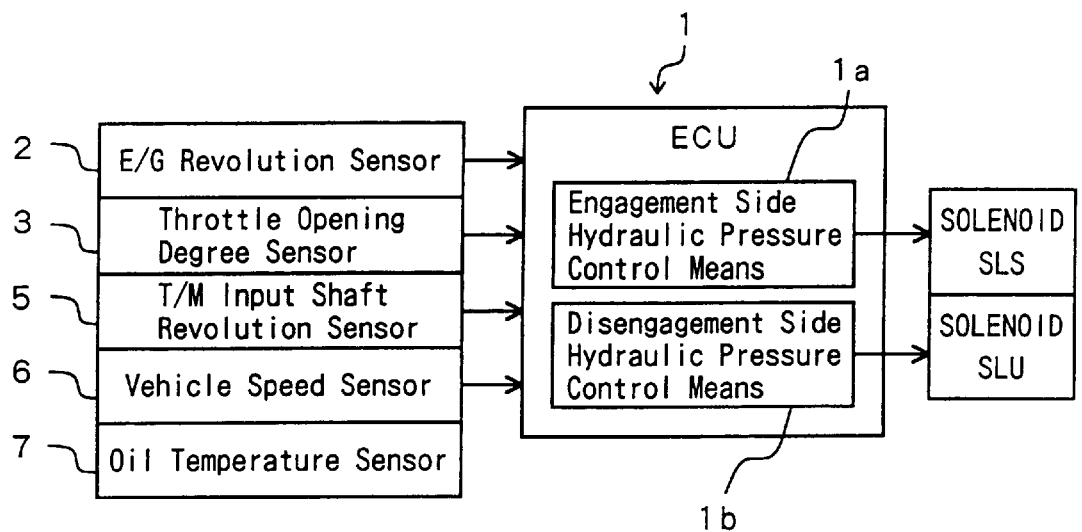
FIG. 1 is a block diagram of an electronic portion of a control system according to the present invention.

FIG. 1 is a block diagram of the electronic portion of the control system. An electronic control section 1, composed of a microcomputer, receives signals from an engine speed sensor 2, a throttle opening degree sensor 3, a transmission (automatic transmission) input shaft speed (=turbine speed) sensor 5, a vehicle speed (=automatic transmission output shaft speed) sensor 6, and an oil temperature sensor 7, respectively. The electronic control section 1, in turn, outputs signals to linear solenoid valves SLS and SLU of a hydraulic circuit. The electronic control section 1 includes engagement side hydraulic pressure control means la which calculates a change in hydraulic pressure supplied to a first hydraulic servo 9 for a first frictional engagement element, i.e. "main clutch" (which will be described later), and outputs the result of that calculation as a signal to the linear solenoid valve (hydraulic pressure operating means) SLU, and disengagement side hydraulic pressure control means 16 which calculates a disengaging hydraulic pressure supplied to a second hydraulic servo 10 for a second frictional engagement element, i.e. "sub-clutch" (which will be described later), in accordance with (depending upon) the change in hydraulic pressure supplied to the hydraulic servo 9 and outputs the result as a signal to the linear solenoid valve (hydraulic pressure operating means) SLS.

Figure 2:
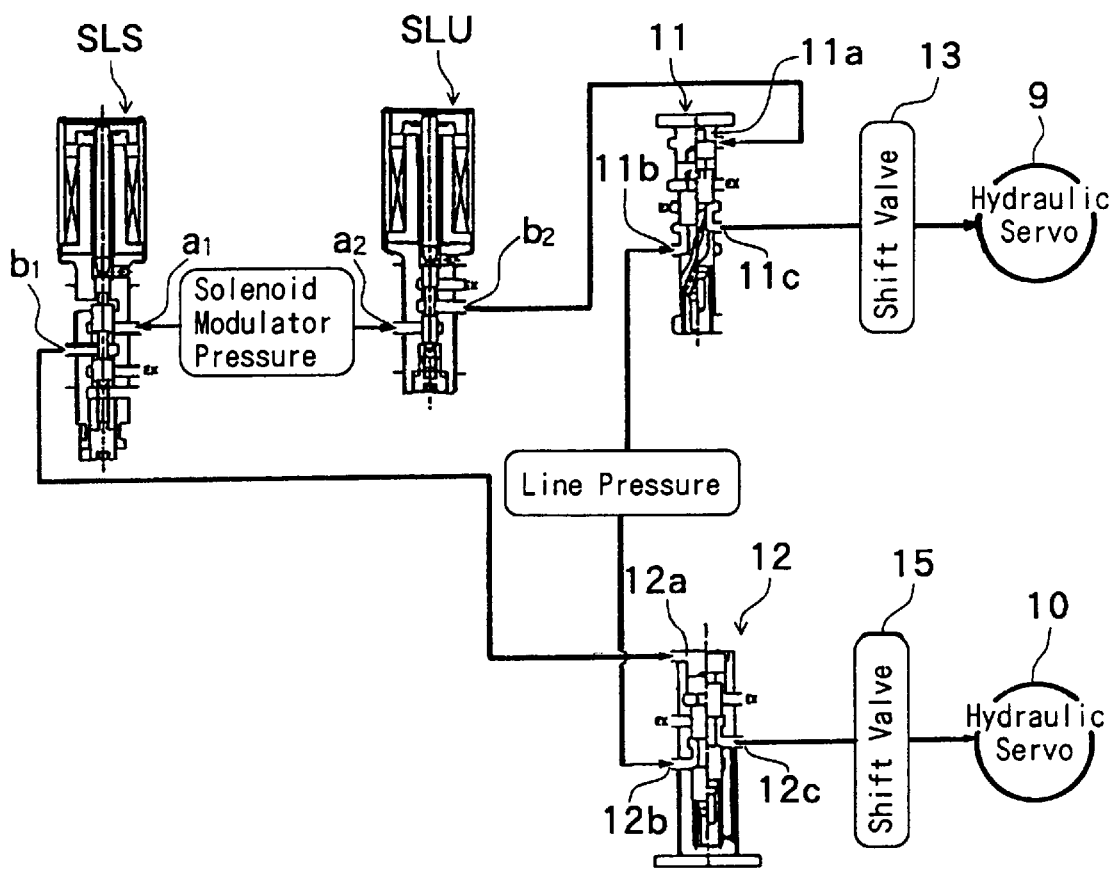
FIG. 2 is a schematic view of a hydraulic circuit for the control system according to the present invention.

FIG. 2 is a schematic diagram of the hydraulic circuit portion of the control system which includes, in addition to the aforementioned two linear solenoid valves SLS, SLU, a plurality of hydraulic servos 9, 10 for engaging/disengaging a plurality of the frictional engagement elements for achieving speed change stages, for example, five forward speeds and a single backward speed, by switching the torque transfer path through a planetary gear unit in the automatic transmission mechanism. Solenoid modulator pressures are supplied to the input ports $a_1$, $a_2$ of the linear solenoid valves SLS, SLU. Control hydraulic pressures from the output ports $b_1$, $b_2$ of the linear solenoid valves are supplied to control hydraulic pressure chambers 11a, 12a of pressure control valves 11, 12, respectively. The pressure control valves 11, 12 receive line pressures supplied to their respective input ports 11b, 12b. Then, pressures adjusted by the aforementioned control pressures are supplied from the output ports 11c, 12c to the hydraulic servos 9, 10 through respective shift valves 13 and 15.

The hydraulic circuit shown herein is limited to components necessary to illustrate the present invention, and only hydraulic servos 9, 10 and the shift valves 13, 15 are shown for this purpose. However, actually, a greater number of hydraulic servos are associated with the automatic speed change mechanism and with additional shift valves.

Up-shift control by change-over (clutch-to-clutch) of the frictional engagement elements will now be explained for the case of a speed change from the second to the third speed (2–3 speed change). The 2–3 speed change is achieved by engaging a fifth brake (B5) and disengaging a fourth brake (B4) in the automatic speed changing mechanism (not shown). At the time of an up-shift, the engagement side hydraulic pressure is the object of the primary control, while the disengagement side hydraulic pressure is controlled depending on the engagement side hydraulic pressure. Consequently, the fifth brake which is on the engagement side serves as a main clutch MC while the fourth brake which is on the disengagement side serves as a sub-clutch SC.

Figure 3:
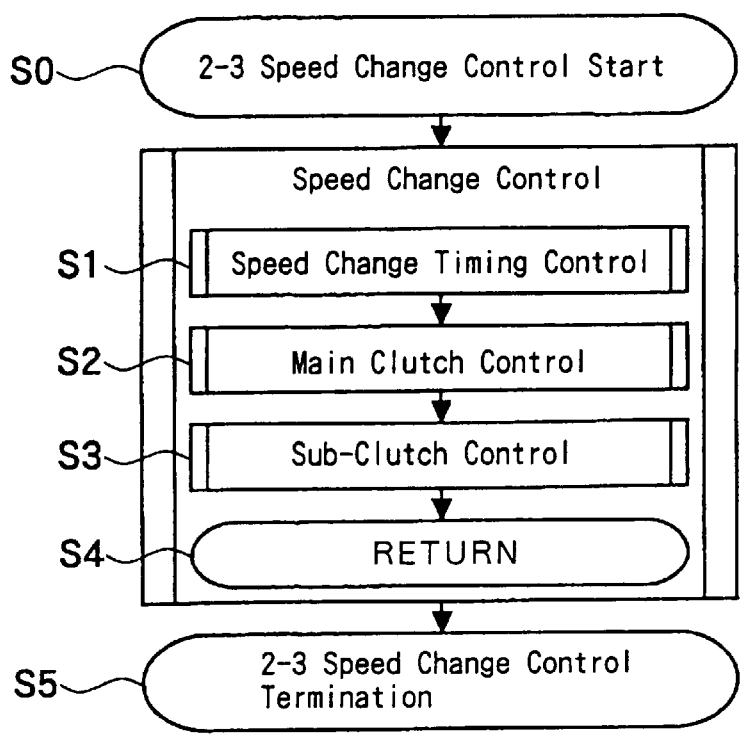
FIG. 3 is a flow chart of a main routine for 2–3 speed change control.

As shown in FIG. 3, if the 2–3 speed change control is executed through the successive steps, that is, from speed change timing control (S1), through main clutch control (S2) and sub-clutch control (S3) to return operation (S4), the 2–3 speed change control is then terminated (S5).

Figure 4:
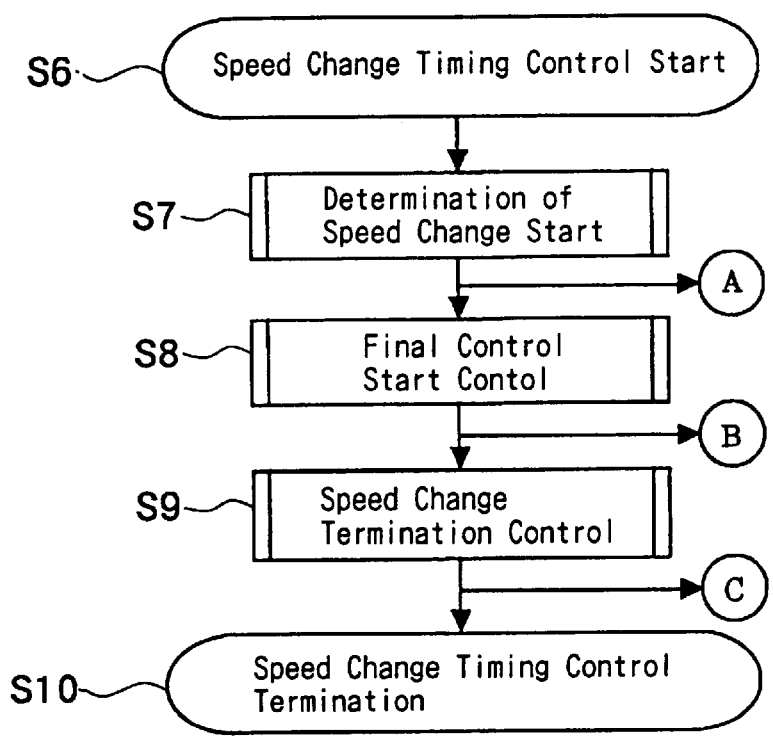
FIG. 4 is a flow chart of a routine for speed change timing control.
Figure 5:
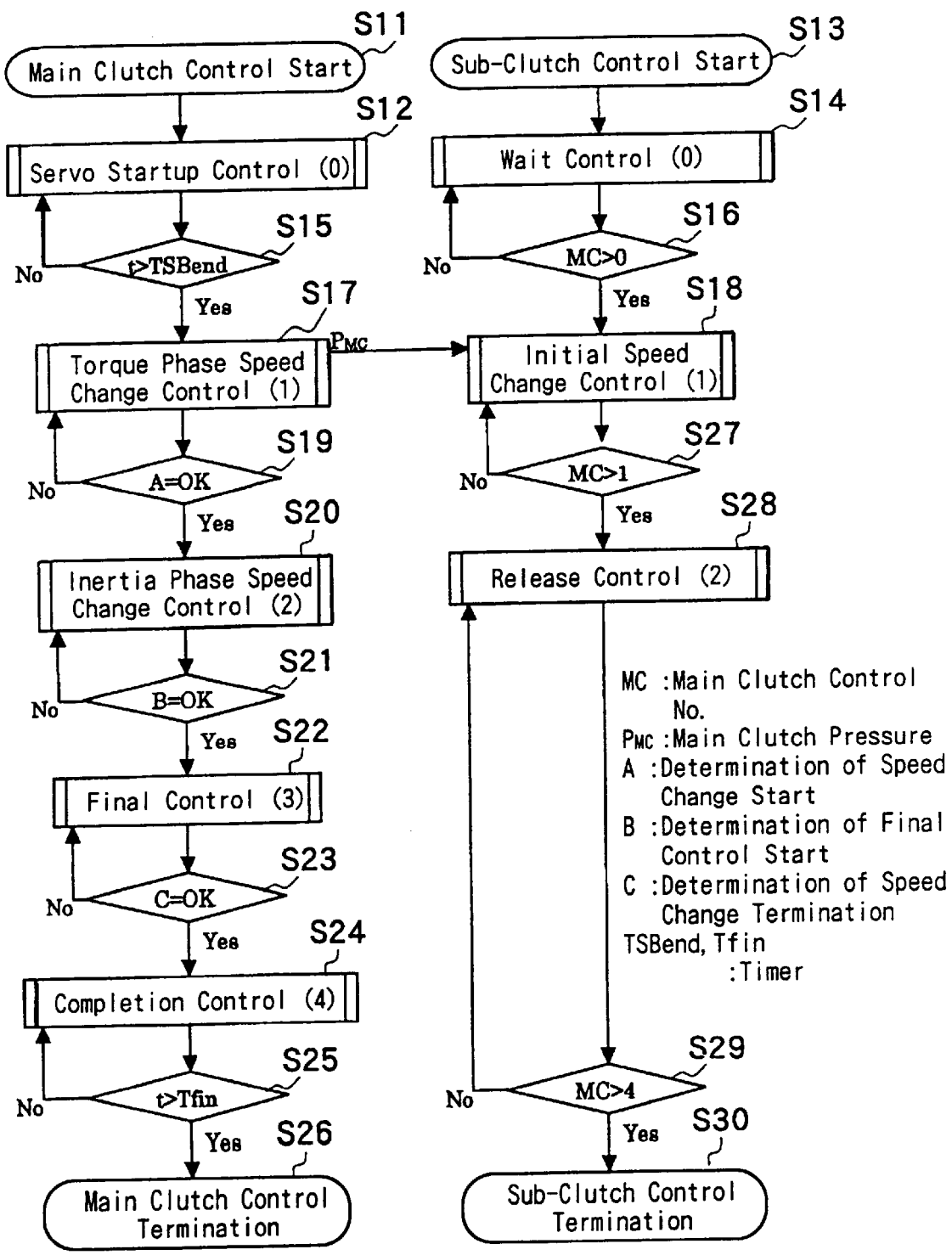
FIG. 5 is a flow chart of a routine for main clutch control and sub-clutch control.

As shown in FIG. 4, if the speed change timing control is started (S6), a judgment on speed change startup (A) is made (S7) and the result thereof is related as a judgment A to the routine of FIG. 5 (S19) which will be described later. Then, a judgment on termination control startup is made (S8) and the result thereof is related as a judgment B in the routine of FIG. 5 (S21). Furthermore, a judgment on speed change termination is made (S9) and the result thereof is related as a judgment C in the routine of FIG. 5 (S23). Then, the speed change timing control is terminated (S10).

Now, referring to FIG. 5, main clutch control and sub-clutch control will be explained. After the main clutch control has been started (S11), namely after the 2–3 speed change has been determined, servo startup control (0) is started (S12). At the same time, after sub-clutch control has been started (S13), namely, after the 2–3 speed change has been determined, wait control (0) is executed (S14). The wait control is continued for a predetermined period of time $TSB_{end}$ and after that period of time has lapsed, torque phase speed change control (1) is executed (S15). Synchronously therewith, the wait control of the sub-clutch side is terminated and then initial speed change control (1) is executed (S16). In the servo startup control (S12), the main clutch MC which is on the engagement side is temporarily supplied with a sufficient amount of oil for starting a piston stroke. Then, the hydraulic pressure is controlled to a predetermined value (piston stroke pressure) such that the piston is moved to narrow the gaps between the friction plates, and a period of time TBS sufficient for the servo startup is preliminarily set. On the other hand, in the aforementioned wait control (S14), the sub-clutch SC which is on the disengagement side remains engaged to maintain the second speed stage until the servo startup control is terminated.

Figure 6:
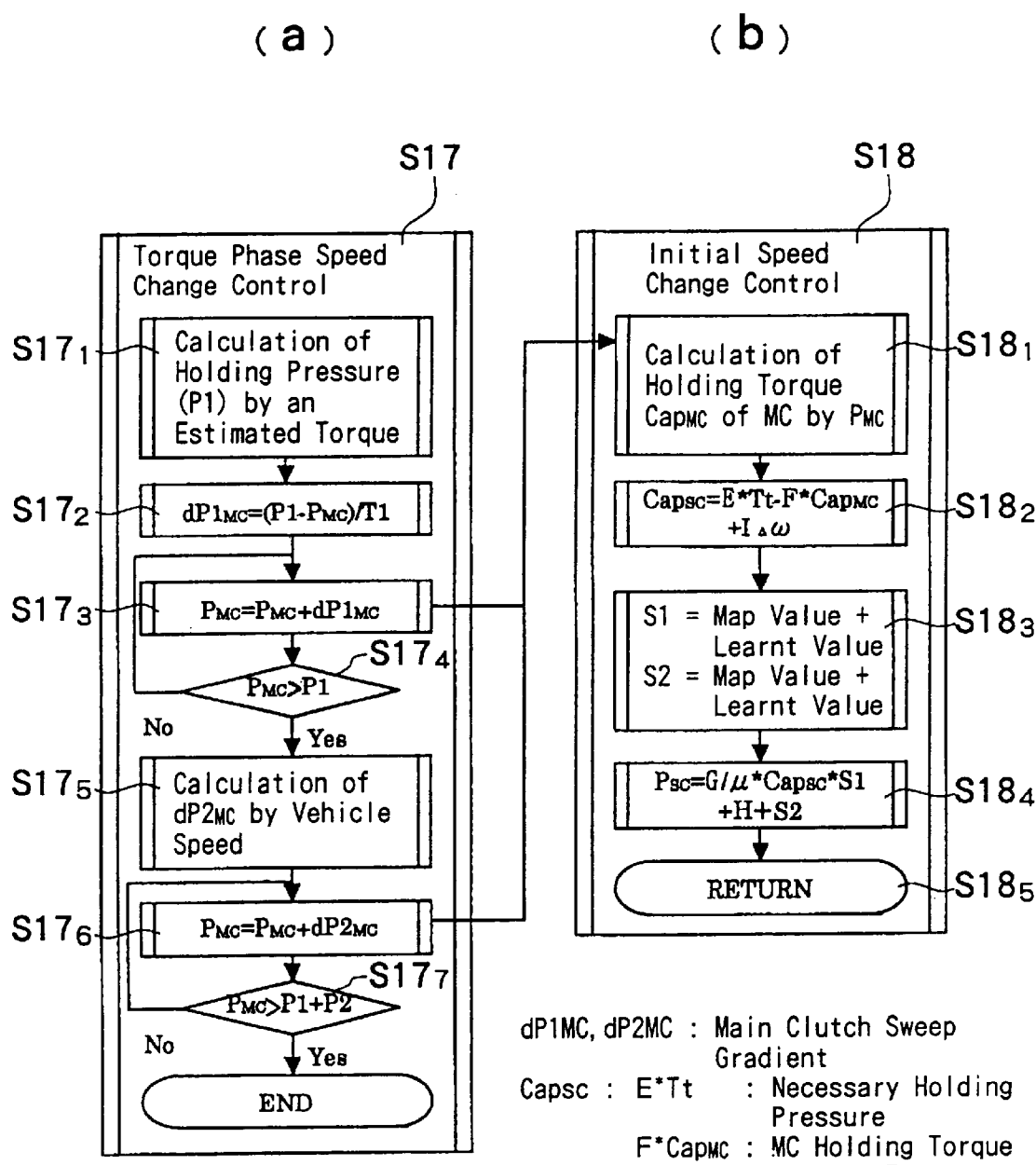
FIG. 6(*a*) is a flow chart of a subroutine for torque phase speed change control of the main clutch (step S17 in FIG. 5) and FIG. 6(*b*) is a flow chart of a subroutine for the initial speed change control of the sub-clutch (step S18 in FIG. 5).

Subsequently, torque phase speed change control (1) is executed in the main clutch MC (S17) and initial speed change control (1) of the sub-clutch SC is executed (S18). As shown in FIG. 6(a), in the torque phase speed change control (S17), a holding pressure P1 is calculated from an estimated input torque. That is, a target engagement hydraulic pressure P1 is calculated for the point in time immediately before start of change in input rotary speed, calculated based on the input (turbine) torque ($S17_1$). The aforementioned input torque is calculated by obtaining an engine torque from a degree of throttle opening and an engine speed based on a map, calculating a velocity ratio from the input/output speeds of the torque converter, obtaining a torque ratio from the velocity ratio according to the map, and finally multiplying the engine torque by the torque ratio.

A first sweep gradient dP1MC is calculated from the holding pressure (target engagement pressure) P1 and a predetermined time T1 obtained by taking into account response delay in hydraulic pressure on the engagement side ($S17_2$). That is, provided that the hydraulic pressure in the main clutch is $P_{MC}$, the first sweep gradient can be obtained from the equation: $dP1_{MC}=(P1-P_{MC})/T1$). Then, based on the first sweep gradient, the main clutch side hydraulic pressure PMC sweeps up ($S17_3$). The engagement hydraulic pressure PMC during that sweep-up is: $P_{MC}=P_{MC}+dP1_{MC}$. The first sweep-up is continued until the holding pressure P1 is reached ($S17_4$). That is, the engagement hydraulic pressure $P_{MC}$ of the main clutch sweeps up from a piston stroke pressure toward the holding pressure (target engagement pressure) P1 calculated based on the estimated torque, with the first sweep gradient.

Next, based on vehicle speed (also, the input speed), a second sweep gradient $dP2_{MC}$ is calculated. Namely, a speed change rate as a target of the input shaft speed when that speed has started to change is calculated, and then, based on an amount of change in hydraulic pressure calculated from the speed change rate, the second sweep gradient $dP2_{MC}$ is calculated. In this case, the second sweep gradient is gentler than the first sweep gradient. Then, the main clutch side hydraulic pressure sweeps up with the second sweep-up gradient (S17$_6$; P$_{MC}$=P$_{MC}$+dP2$_{MC}$). That sweep-up is continued until a predetermined engagement pressure (P1+P2) is reached (S17$_7$; P$_{MC}$>P1+P2). That is, the sweep-up is continued until a hydraulic pressure (P1+P2) is reached, which allows the input speed change rate to be detected by an input rotary speed sensor 5 and the judgment (A) on the start of speed change to be made.

On the other hand, in the initial speed change control (S18) of the sub-clutch SC side, as shown in FIG. 6(b), holding torque Cap$_{MC}$ of the main clutch MC is calculated first, based on the aforementioned hydraulic pressure P$_{MC}$ (see S17$_3$, 17$_6$). Subsequently, based on that calculated holding torque, a holding torque Cap$_{SC}$ of the sub-clutch SC is calculated (S18$_2$). Where the input (turbine) torque is T$_t$, the holding torque of the main clutch is Cap$_{MC}$, the inertia torque of the vehicle is I∆ω, and E and F are predetermined coefficients, sub-clutch holding torque Cap$_{SC}$ can be obtained from the equation: Cap$_{SC}$=E×T$_t$−F×Cap$_{MC}$+I$_O$ω. Furthermore, the tie-up ratios (allowances) S1, S2 are calculated from the map value and the learned value (S18$_3$). Then, based on the sub-clutch holding torque and the tie-up ratios S1, S2 and the like, the hydraulic pressure P$_{SC}$ supplied on the sub-clutch side is calculated (S184). That is, where the frictional material area of the sub-clutch is G, the frictional coefficient thereof is µ, and the servo stroke pressure of the disengagement side is H, the hydraulic pressure P$_{SC}$ on the sub-clutch side can be obtained from the equation: P$_{SC}$=(G/µ)×Cap$_{SC}$×S1+H+S2. Then, the disengagement control of the sub-clutch following the engagement side hydraulic pressure P$_{MC}$ of the main clutch MC is returned (S18$_5$)

Figure 7:
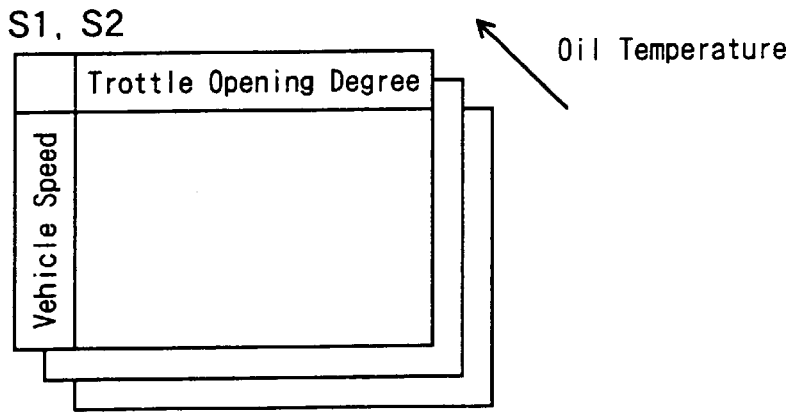
FIG. 7 illustrates map data for obtaining a tie-up ratio.
Figure 8:
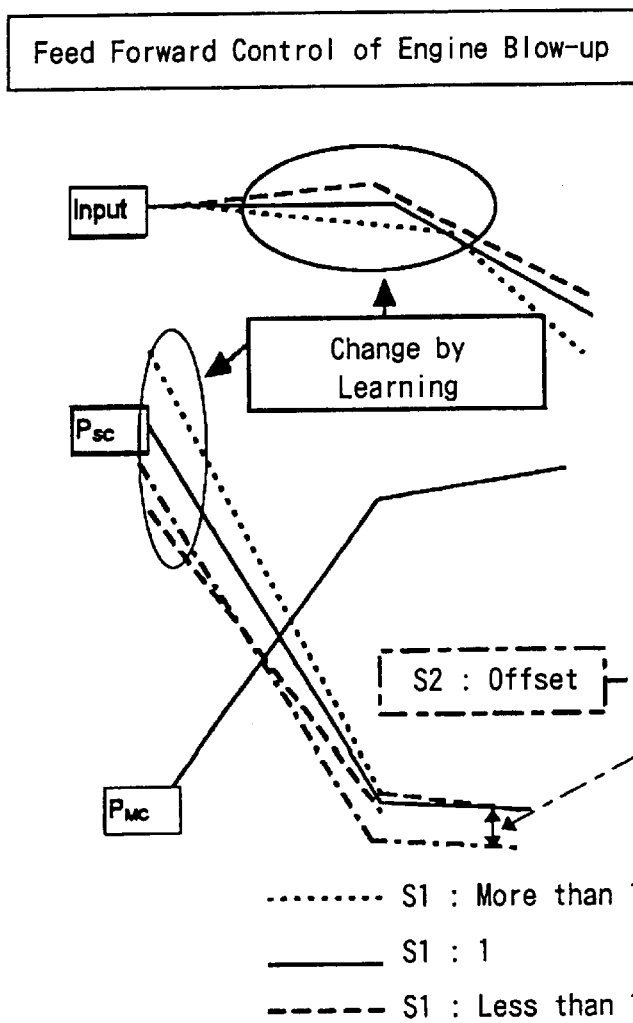
FIG. 8 is a diagram illustrating feed forward control by learning of the tie-up ratio.
Figure 9:
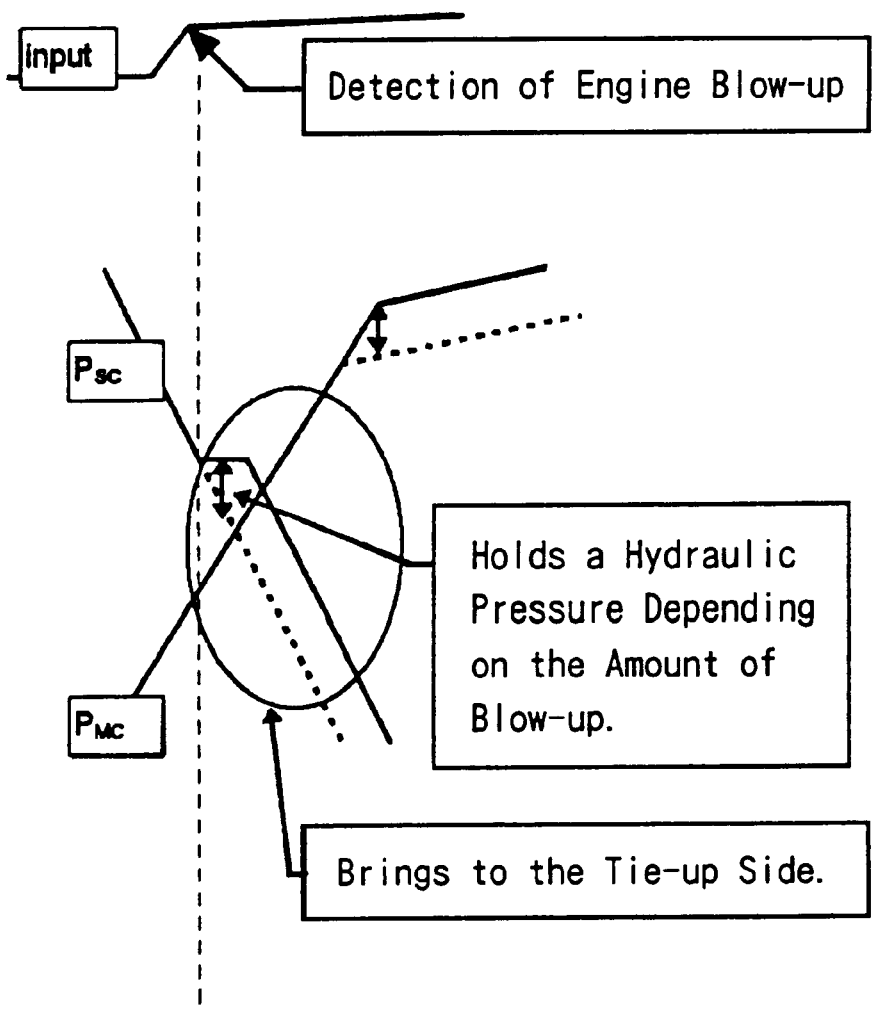
FIG. 9 is a diagram illustrating real-time feedback control.

The aforementioned tie-up ratios (amounts) S1, S2 will be described with reference to FIGS. 7 and 9. The tie-up ratios S1, S2 are determined from any of a plurality of throttle opening degree/vehicle speed maps for different oil temperatures. That is, although the viscous resistance of oil varies with its temperature, and consequently its response time for changes in hydraulic pressure varies, it is possible to prevent unnecessary engine racing and excessive tie-up. This is achieved by correcting the change in the response time because the tie-up ratio used varies depending on the oil temperature. Thus, an appropriate speed change control is executed. Next, as shown in FIG. 8, the tie-up ratios S1, S2 are learned by monitoring the amount of the engine racing based a change in the rotary speed of the input shaft and the tie-up ratios S1, S2 are preliminarily corrected (feed-forward control). The first tie-up ratio S1 is for correcting the sweep-down gradient of the disengagement side hydraulic pressure P$_{SC}$. As shown with broken lines in FIG. 8, when the engine is likely to race (blow up), a correction is made to obtain a gentle gradient, thereby disengaging the sub-clutch relatively late. On the other hand, as shown by the dotted lines, when the engine speed is likely to decrease, a correction is made to obtain a steep gradient, thereby disengaging the sub-clutch relatively early. As shown with a solid line, if the input shaft revolution causes no engine racing or tie-up, the sweep-down of the disengagement side hydraulic pressure P$_{SC}$ is an ideal characteristic and the first tie-up rate S1 is set to 1. If there is a decrease in engine speed as shown with broken lines, the tie-up ratio S1 is set to a value above 1. If there is engine racing, as shown with dotted lines, the tie-up ratio is corrected to a value below 1. Thus, in executing an up-shift speed change operation by change-over, a predetermined overlap is achieved between the main clutch MC on the engagement side and the sub-clutch SC on the disengagement side. In this case, the sub-clutch side hydraulic pressure P$_{SC}$ is determined so that minute, predetermined engine racing, which will not give any uncomfortable feeling to the driver, is provided. Such minute, predetermined engine racing is detected as a change in input rotary speed. Thus, excessive tie-up as well as excessive engine racing can be avoided.

The second tie-up ratio (amount) S2 is provided to correct an offset value relative to the input torque. As shown with a dashed line in FIG. 8, the offset value is set upward or downward relative to the disengagement side hydraulic pressure P$_{SC}$ as indicated with a solid line. Namely, the aforementioned offset value is set, taking into account a response delay in the hydraulic pressure on the engagement side. Then, appropriate change-over timing is obtained from the response delay in hydraulic pressure on the engagement side, by causing the disengagement side hydraulic pressure P$_{SC}$ to wait, using the offset value resulting from the second tie-up ratio S2. Then, the first and second tie-up ratios S1, S2 are gradually brought to optimum values as the learning is repeated.

Furthermore, despite the learning for the tie-up ratios S1, S2, excessive engine racing sometimes occurs. Thus, as shown in FIG. 9, real-time feedback control is executed. That is, if an amount of engine racing larger than a predetermined value is detected by the input shaft revolution sensor, the operation for reducing the disengagement side hydraulic pressure P$_{SC}$ is stopped immediately. This reducing operation remains stopped until the amount of engine racing reaches the predetermined value, and the second tie-up ratio S2 is offset so that the disengagement side hydraulic pressure is increased by a value corresponding to the amount of engine racing. As a result, the disengagement side hydraulic pressure is supplied relatively late so that a tie-up (wherein the engagement side clutch and the disengagement side clutch are simultaneously engaged) occurs. The engagement hydraulic pressure on the main clutch side is also increased. As a consequence, during a speed change operation, the engine never races over a predetermined value because of erroneous detection of engine revolution, throttle opening degree or the like.

Next, if the input shaft revolution sensor 5 detects a change in rotary speed of the input shaft, speed change start (A) is determined (S19), so that the torque phase speed change control (1) is terminated and the inertia phase speed change control (2) is started (S20). The inertia phase speed change control is executed by gradually raising (sweeping up) the main clutch hydraulic pressure P$_{MC}$ from a hydraulic pressure wherein the holding torque Cap$_{MC}$ of the main clutch MC is larger than the input torque T$_T$, by means of feedback control while detecting a change in the input speed. This is continued until a predetermined ratio of amount of speed change to completion of the speed change, for example 70% is achieved. Final control start (B) is determined when the predetermined ratio has been surpassed (S21), and then the final control is executed (S22).

In the final control (S22), the main clutch hydraulic pressure P$_{MC}$ is kept substantially constant or swept up with a very gentle gradient. This is continued until the total target amount of change in the input shaft speed is reached. If there is no change in speed of the input shaft, the speed change termination (c) is determined (S23), and then completion control (4) is executed (S24). In the completion control, the engagement hydraulic pressure is raised with a steep gradient up to a line pressure by change-over of the shift valves or the like. When a predetermined period of time T$_{fin}$ has lapsed (S25), the main clutch control is terminated (S26).

On the other hand, on the sub-clutch side, if the main clutch side is in torque phase speed change control (1), the aforementioned initial speed change control (1) is continued. If the torque phase speed change control is terminated and the inertia phase speed change control (S27; MC>1) begins, the torque phase speed change control is terminated and release control (2) is started (S28). In the release control, the sub-clutch side hydraulic pressure $P_{SC}$ is released with a steep gradient so as to achieve a drained state. Then, the release control is continued if the main clutch side is in a state lower than in completion control (4) (MC>4), namely, the inertia phase control (2), the final control (3) and the completion control (4). When the completion control is terminated (S29), the sub-clutch control is terminated (S30).

Then, referring to FIGS. 10 and 11, the up-shift control in high and low torque states (including a state in which the input torque is 0 or negative, that is, the power-off state) will be described. As shown in these figures, numerals 0, 1, 2,... are allocated to the main clutch MC and the sub-clutch SC respectively. Each of these numerals indicates a control stage corresponding to a numeral in parentheses for each of the control operations of FIG. 5.

Figure 10:
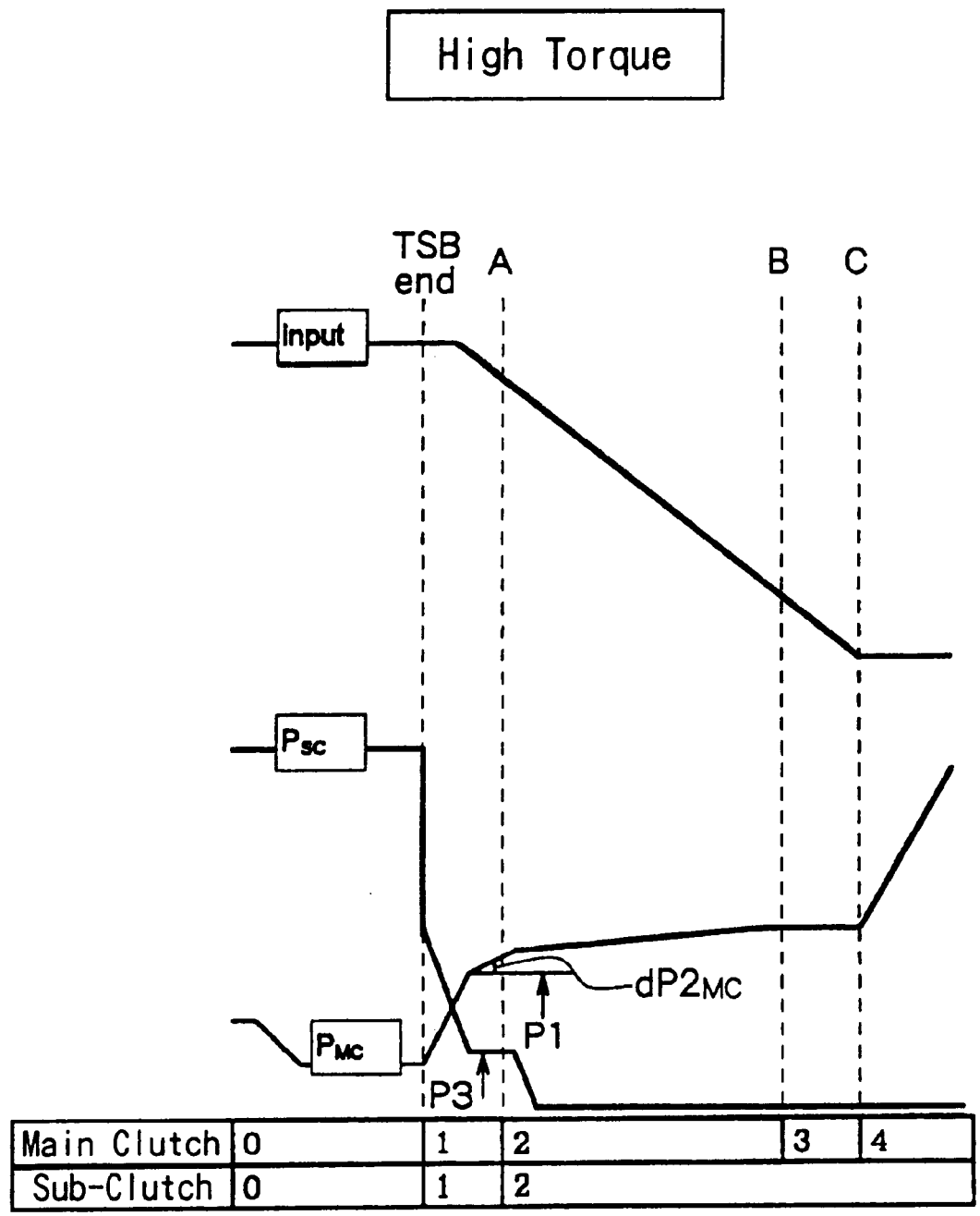
FIG. 10 is a graph of hydraulic pressure in up-shift control at a high torque.

FIG. 10 illustrates hydraulic characteristics in the high torque state in which up-shift (2–3 speed change) is executed with an accelerator pedal depressed gently (the power-on state). First, the engagement hydraulic pressure $P_{MC}$ on the main clutch side is subjected to servo startup control (0) so that a predetermined piston stroke pressure is attained. Then, the servo startup control is continued over a predetermined period of time TSB (S12).

The disengaging hydraulic pressure $P_{SC}$ on the sub-clutch side is then subjected to wait control (0) in which it is held at an engaging pressure such as a line pressure (S14).

Then, if the predetermined period of time (TBS$_{end}$) has lapsed, the main clutch is subjected to torque phase control (1) while the sub-clutch is subjected to initial speed change control (1) (S17, S18). The main clutch side hydraulic pressure $P_{MC}$ sweeps up with a first sweep gradient (dP1$_{MC}$) at an estimated input torque toward the holding pressure P1 (S17$_3$). After the holding pressure P1 has been reached, it sweeps up with a second sweep gradient (dP2$_{MC}$) calculated according to a target speed change rate (S17$_6$). Consequently, the main clutch MC serving as the engagement side is in a slipping state in which the torque transfer is gradually increased.

On the other hand, depending on the main clutch side hydraulic pressure $P_{MC}$ and based on the learned tie-up ratios S1, S2, the sub-clutch side hydraulic pressure PSC sweeps down toward a predetermined releasing pressure P3 determined by the offset value based on the disengagement side servo (piston) stroke pressure H and the second tie-up ratio S2 (S18$_4$). As a result, in the sub-clutch SC which is on the disengagement side, the amount of torque transfer decreases gradually. In a state with no engine racing (blow) or no excessive tie-up, the input torque is shifted to the engagement side, so that the sub-clutch SC is subjected to inertia phase control in which the speed of the input shaft increases toward the third speed.

Upon detection of change in speed of the input shaft by the sensor 5, the start of the speed change A is determined. The main clutch side is subjected to inertia phase speed change control (2) and the sub-clutch side is subjected to release control (2) (S20, S22). In the inertia phase speed change control, while the speed of the input shaft is being monitored, the main clutch side hydraulic pressure $P_{MC}$ sweeps up with a relatively gentle gradient based on the feedback control. By release control (2), the sub-clutch side hydraulic pressure $P_{SC}$ is released from the aforementioned predetermined disengaging hydraulic pressure P3 and rapidly drained. On the main clutch side, the start of final control B is first determined (S22). Then, completion control (4) is executed by determination of the termination of the speed change C (S24). The engagement side hydraulic pressure $P_{MC}$ rises up to a line pressure, and then the control is terminated. On the other hand, on the sub-clutch side, release control (2) is continued until terminated with a drained state.

Figure 11:
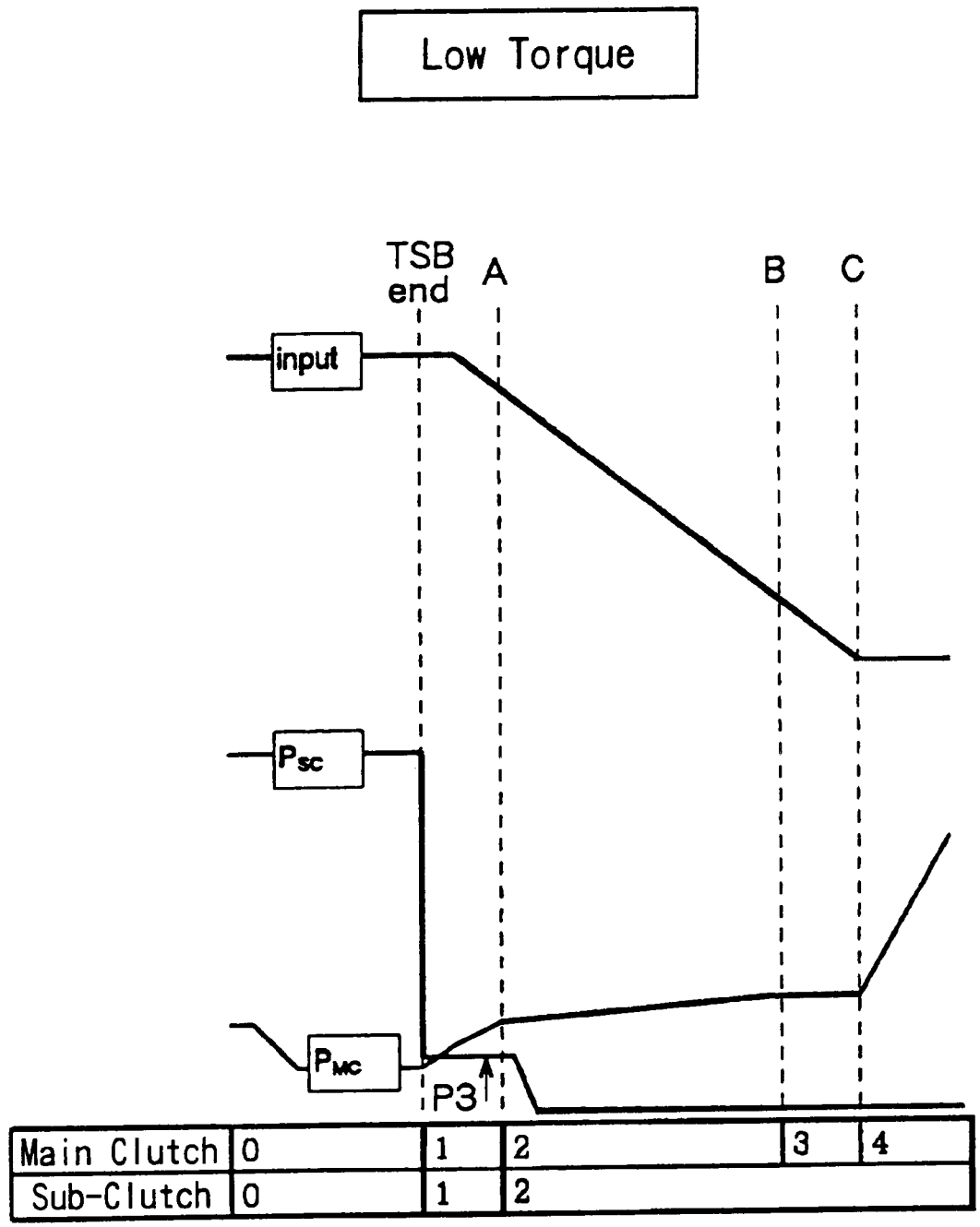
FIG. 11 is a graph of hydraulic pressure in up-shift control at a low torque.

FIG. 11 is a diagram showing the characteristics of hydraulic pressure when an up-shift is executed at a low torque or with the accelerator pedal released. First, the servo startup control (0) on the main clutch side and the wait control (0) on the sub-clutch side are terminated (TSB$_{end}$). Consequently, the main clutch side is subjected to torque phase speed change control (1) while the sub-clutch side is subjected to initial speed change control (1).

At this time, in the torque phase speed change control, the holding pressure P1, calculated from an estimated input torque, is not raised because the input torque is low [the input torque is 0 or negative (the power-off state)] and sweep-up with the second sweep gradient (dP2$_{MC}$) based on the target speed change is conducted. Although the sub-clutch hydraulic pressure $P_{SC}$ in the initial speed change control depends on the aforementioned main clutch hydraulic pressure $P_{MC}$, it is kept at the predetermined disengaging pressure P3 based on the disengagement side servo stroke pressure H and the second tie-up ratio S2, due to the low hydraulic pressure $P_{MC}$.

Then, based on the determination of the speed change start A detected at the input shaft, the main clutch side is subjected to inertia phase speed change control (2) while the sub-clutch side is subjected to release control (2). In the inertia phase speed change control, while reading the input speed, the engaging hydraulic pressure $P_{MC}$ is swept up and, in the release control, the disengaging hydraulic pressure $P_{SC}$ is released quickly so as to drain. On the main clutch side, the control is terminated after the final control (3) and the completion control (4). On the other hand, on the sub-clutch side, the disengaging zero pressure achieved in the above release control (2) is maintained until the completion control is terminated, and then, the control is terminated.

At the time of up-shift speed change control, the main clutch hydraulic pressure $P_{MC}$ which is on the engagement side is directly controlled (main control), while the disengagement side hydraulic pressure $P_{SC}$ for the sub-clutch is controlled dependent on the engagement side hydraulic pressure $P_{MC}$. Thus, regardless of high torque (power on) state or low torque (power off) state, the speed change is always executed on the same control stage 0, 1, . . . .

Figure 12:
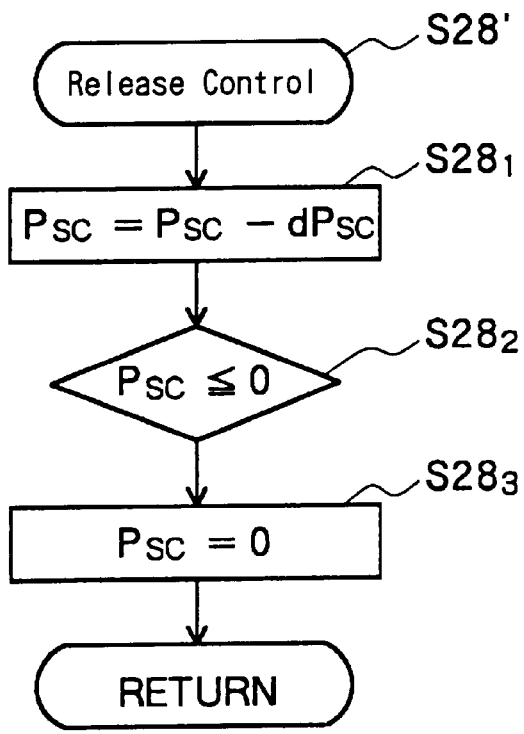
FIG. 12 is a flow chart of a release control routine according to another embodiment.
Figure 13:
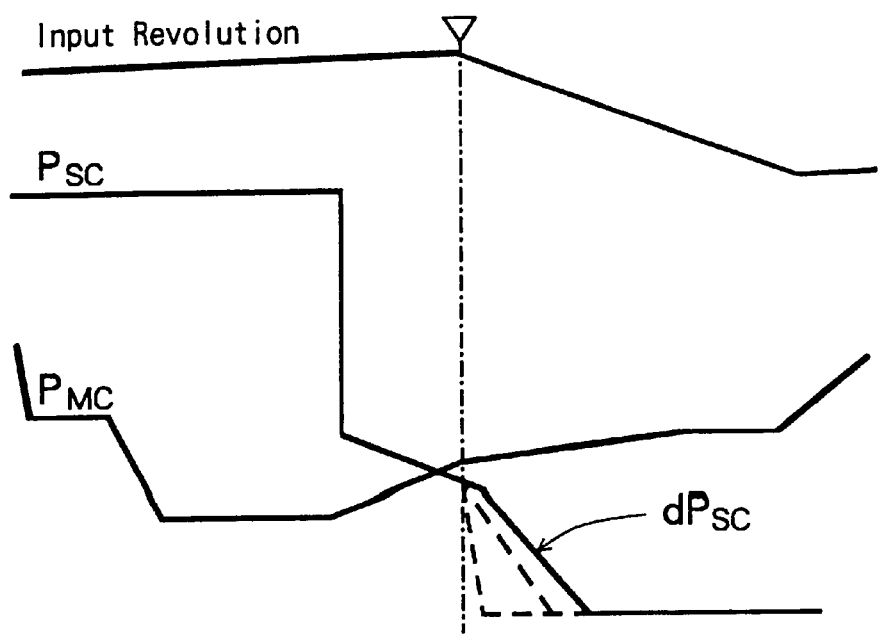
FIG. 13 is a graph showing correlation of input rotary speed and hydraulic pressures.

Other embodiments of the release control will now be explained with reference to FIGS. 12 through 14.

According to the previously described embodiment, in the release control (S28), the sub-clutch hydraulic pressure is released from the predetermined pressure P3 based on the piston stroke pressure H with a steep gradient until drained. Thus, although under the predetermined hydraulic pressure P3, the disengagement side sub-clutch SC is generating a dragging torque. If the input torque has a low value close to 0, as in the case of the power-off up-shift, the dragging torque produced by the predetermined hydraulic pressure P3 becomes larger than the input torque. Then, if the predetermined hydraulic pressure P3 is released all at once, the speed of the input shaft is suddenly changed. As a result, the output torque is changed, so that the speed change may cause a shock. In the power-on up-shift, if the predetermined hydraulic pressure P3 is slowly and completely released, the dragging torque is tied up with the engagement side torque, which may cause the output shaft torque to drop.

According to this embodiment, the disengaging hydraulic pressure $P_{SC}$ is changed by the input torque. Namely, referring to FIGS. 12 and 13, in release control S28', the amount of change in the disengaging hydraulic pressure $dP_{SC}$ is calculated from the estimated input torque. The sub-clutch disengaging hydraulic pressure $P_{SC}$ is swept down by changing the sweep gradient based on the amount of the change in the hydraulic pressure (S281). That sweep-down is continued until the disengaging hydraulic pressure $P_{SC}$ is completely drained ($P_{SC}$=0) (S282, S283). Thus, by changing the disengaging hydraulic pressure $P_{SC}$ during the release control depending on the monitoring condition, optimum speed change control is always realized.

Figure 14:
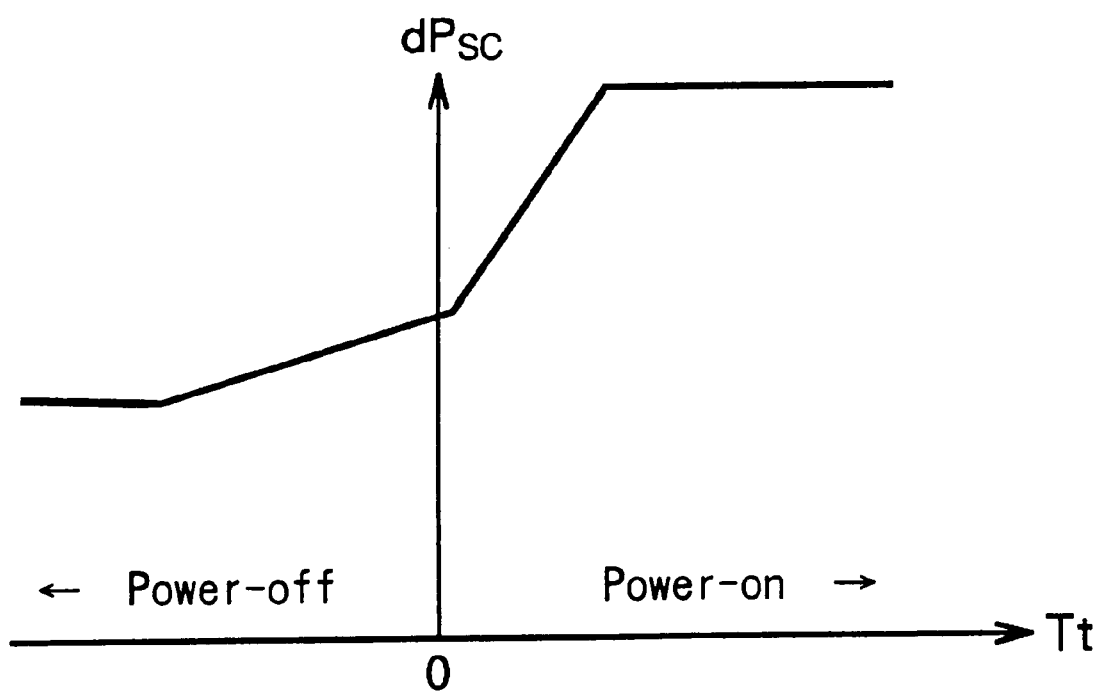
FIG. 14 is a graph of amount of change in the disengaging hydraulic pressure.

The amount of the change in the disengaging hydraulic pressure $dP_{SC}$ is, as shown in FIG. 14, set to a relatively large value in the power-on state, and to a relatively small value in the power-off state. These states connect through a two-stage gentle gradient. Consequently, at the time of power-on, the disengagement side hydraulic pressure $P_{SC}$(= $P_{SC-dPSC}$) is released early to prevent the aforementioned tie-up from occurring. Furthermore, at the time of power-off, the disengaging hydraulic pressure $P_{SC}$ is reduced gradually to prevent speed change shock.

Although the above embodiments have been described with respect to the 2–3 speed change control, it should be noted that the present invention can be applied to any shift control using any other pattern of change-over.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic control apparatus for an automatic transmission including an input shaft for receiving drive power from an engine output shaft, an output shaft connected to vehicle drive wheels, a plurality of frictional engagement elements for establishing and changing a torque transfer path between the input shaft and the output shaft and hydraulic servos for engaging and disengaging said plurality of the frictional engagement elements, wherein a first frictional engagement element of said plurality is engaged while a second frictional engagement element of said plurality is disengaged to achieve an up-shift to a predetermined speed stage, said control system comprising:

hydraulic operating means for controlling hydraulic pressure of at least first and second hydraulic servos for operating, respectively, said first and second frictional engagement elements;

a plurality of sensors for detecting various vehicle operating conditions and for outputting signals representative of the detected operating conditions;

a control unit for receiving said signals from said sensors and for outputting hydraulic control signals to said hydraulic operating means, said control unit comprising:

engagement side hydraulic control means for calculating a change in hydraulic pressure applied to said first hydraulic servo and outputting the result as a hydraulic control signal to said hydraulic operating means;

disengagement side hydraulic control means for calculating a disengagement hydraulic pressure for said second hydraulic servo as a function of the hydraulic pressure applied to said first hydraulic servo and for outputting the result as a hydraulic control signal to said hydraulic operating means; and means for controlling the disengaging hydraulic pressure of said second hydraulic servo, based on detection of the amount of engine racing at the time of a speed change, and for preventing the disengaging hydraulic pressure decreasing, if said amount of engine racing exceeds a first predetermined value, until said amount of engine racing reaches a second predetermined value.

2. A hydraulic control apparatus for an automatic transmission according to claim 1 wherein the hydraulic pressure applied to said first hydraulic servo is swept-up with a gradient calculated based on (1) a holding pressure immediately preceding initiation of an inertia phase, determined based on input torque, and (2) a period of time predetermined by taking into account a response delay in hydraulic pressure.

3. A hydraulic control apparatus for an automatic transmission according to claim 1 wherein the disengaging hydraulic pressure of said second hydraulic servo has a pressure gradient and further comprising first tie-up correcting means for calculating a correcting value for said pressure gradient of said second hydraulic servo to provide a predetermined amount of engine racing.

4. A hydraulic control apparatus for an automatic transmission according to claim 3 further comprising second tie-up correcting means for further correcting the gradient of said disengaging hydraulic pressure with an offset value.

5. A hydraulic control apparatus for an automatic transmission according to claim 4 wherein said first and second tie-up correcting means are modified by learning based on the amount of engine racing.

6. A hydraulic control apparatus for an automatic transmission according to claim 4 wherein one of said plurality of sensors detects oil temperature of oil supplying the hydraulic pressure and wherein said first and second tie-up correcting means are responsive to detected changes in the oil temperature.

7. A hydraulic control apparatus for an automatic transmission according to claim 1 wherein the disengaging hydraulic pressure in said second hydraulic servo is controlled responsive to at least one of the detected operating conditions.

8. A hydraulic control apparatus for an automatic transmission according to claim 7 wherein the disengaging hydraulic pressure is reduced at a greater rate at the time of power-on than at the time of power-off.

* * * * *